United States Patent
Brown

[11] 3,713,703
[45] Jan. 30, 1973

[54] SHUTTLE VALVE
[75] Inventor: Max Murrow Brown, Seminole, Fla.
[73] Assignee: Deere & Company, Moline, Ill.
[22] Filed: March 11, 1971
[21] Appl. No.: 123,356

[52] U.S. Cl. .................... 303/10, 137/107, 303/52, 303/54, 303/59
[51] Int. Cl. ........................ B60t 13/18, B60t 15/04
[58] Field of Search ............... 303/52, 54, 10, 68–69, 303/59; 137/107

[56] References Cited
UNITED STATES PATENTS

| | | | |
|---|---|---|---|
| 2,593,103 | 4/1952 | Casler | 137/107 |
| 3,093,153 | 6/1963 | Horowitz | 303/69 |
| 3,317,252 | 5/1967 | Gassman | 303/54 |
| 3,537,759 | 11/1970 | Du Bois | 303/10 |
| 3,566,903 | 3/1971 | Honeycutt | 137/107 |

Primary Examiner—Milton Buchler
Assistant Examiner—John J. McLaughlin
Attorney—H. Vincent Harsha, Harold M. Knoth, William A. Murray, John M. Nolan and Jimmie R. Oaks

[57] ABSTRACT

The return of actuating fluid from a vehicle brake is diverted to a sump-connected bypass line and is prevented from returning through the brake control valve by a shuttle valve which is interposed in the brake line between the brake and the control valve. The shuttle valve shifts in response to the fluid pressure in the brake line to connect fluid pressure to the brakes and block the bypass line when the control valve is positioned for actuating the brake and to block the brake line and open the bypass line when the control valve is positioned for deactivating the brake.

1 Claim, 1 Drawing Figure

PATENTED JAN 30 1973 3,713,703
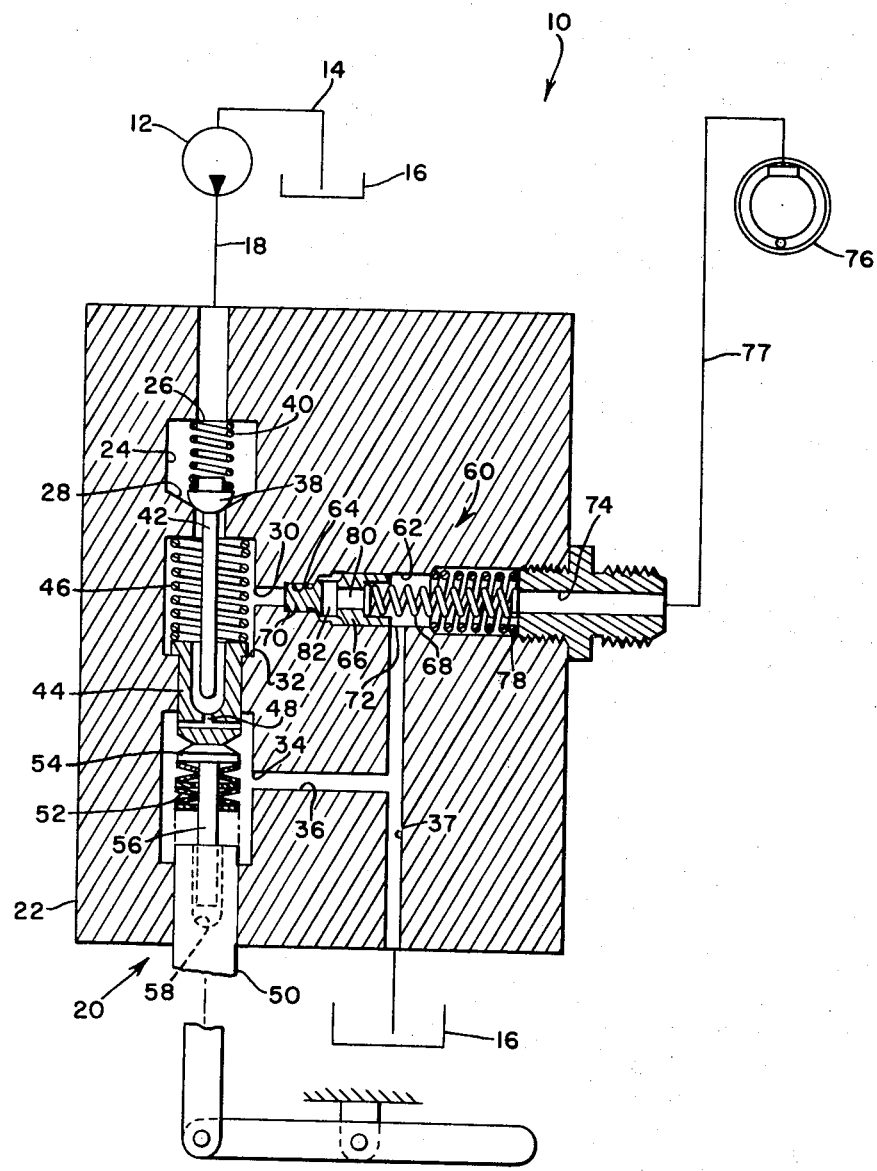
INVENTOR.
M. M. BROWN

SHUTTLE VALVE

BACKGROUND OF THE INVENTION

The present invention relates to a shuttle valve for use in conjunction with a brake control valve and more particularly relates to a shuttle valve for routing return fluid around a brake control valve of the type illustrated in U. S. Pat. No. 3,317,252 issued to Gassman on May 2, 1967.

There is disclosed in the aforementioned patent a brake control valve for controlling a vehicle hydraulic brake. The patented design was found to have an undesirable feature. Specifically, when the vehicle brake is deactivated, fluid returning from the brake must pass through the brake valve to reach the sump. This subjects the brake valve to additional wear and disturbs the action thereof.

SUMMARY OF THE INVENTION

According to the present invention, there is provided a novel shuttle valve. Particularly, there is provided a shuttle valve for use with a brake control valve of the type illustrated in U.S. Pat. No. 3,317,252.

It is an object of the invention to provide a shuttle valve which is mounted in the brake line to a vehicle brake and which is shiftable in response to fluid pressure in the brake line for blocking a bypass line and opening the brake line when the brake control valve is shifted to a position for actuating the brake and for blocking the brake line and opening the bypass line when the brake control valve is shifted to a position for deactivating the brake.

A further object is to provide a shuttle valve which is of simple and compact design.

These and other objects will become apparent from the ensuing description and the appended drawing.

BRIEF DESCRIPTION OF THE DRAWING

The sole FIGURE is a schematic of the brake control system showing the brake control and shuttle valves in longitudinal section in their closed positions.

DESCRIPTION OF THE PREFERRED EMBODIMENT

The hydraulic brake control system in which the present invention is embodied is indicated in its entirety by the reference numeral 10. The system 10 includes a pump 12 having an inlet line 14 connected to a sump 16 and having a discharge line 18.

A brake control valve 20 includes a valve block 22 in which there is a cylindrical bore 24 connected at one end to the pump discharge line 18 via an axial inlet port 26. Spaced serially in the bore 24 from the inlet port 26 is an annular valve seat 28, an outlet port 30, an annular shoulder 32 and a return port 34, the latter being connected to the sump 16 by a pair of lines 36 and 37. A check valve member 38 is biased into engagement with the seat 28 by a spring 40 for preventing fluid communication between the inlet port 26 and the outlet port 30. The valve member 38 includes an axially extending stem 42, the end of which is received in the opening of an axially shiftable cup-like member 44 slidably mounted in the opening defined by the shoulder 32. The member 44 is biased away from the valve member 38 by a spring 46 and includes a flange which engages the shoulder 32. A passage 48 opens axially into the interior of and extends through the axial end of the member 44 and provides a path for fluid communication between the outlet port 30 and the return port 34 when the check valve member 38 is seated, as illustrated in the drawing.

The valve 20 is actuated by moving the cup-like member 44 axially toward the valve member 38, first closing the passage 48 by engaging the end thereof with the valve stem 42 and thereafter moving the valve stem 42 to unseat the valve member 38. Movement of the member 44 is accomplished through means of a lever-operated plunger 50 which acts against one end of a stack of Belleville washers 52, the other end of the washers acting to engage a spring-retaining member 54 with the end of the cup-like member 44. The spring-retaining member 54 includes a stem 56 which is slidably received in a socket 58 in the end of the plunger 50. Thus, it can be seen that the stack of Belleville washers 52 acts as modulating spring means during actuation of the valve 20.

A shuttle valve 60 shares the valve body 22 with the brake valve 20 and includes a valve bore 62 having a reduced-in-diameter end 64 connected to the outlet 30 of the brake valve 20. A cylindrical valve member 66 is slidably received in the bore 62 and is biased to the left, in the illustration, by a spring 68 to dispose a reduced-in-diameter end portion 70 into blocking relation to the bore end portion 64 when the vehicle brake valve 20 is closed, as illustrated. When the valve member 66 is so located, it is slightly to the left of a bypass or return port 72, which is connected to the sump 16 via the line 37 and is in fluid communication with an outlet port 74 at the right end of the bore 62. A brake 76 is connected to the port 74 by a line 77. When fluid pressure is directed to the outlet port 30 of the brake valve 20 for actuating the brake 76, the pressure acts to shift the valve member 66 to the right against the spring 68 until the right end of the valve member 66 abuts against a stop in the form of a compression spring 78. At this position, the valve member 66 blocks the bypass port 72 and is removed from the bore portion 64. A fluid passage 80 extends axially in the valve member 66 from the right end thereof and terminates in radial openings 82 which are in fluid communication with the bore portion 64 when the bore portion 64 is unblocked. Thus, it can be seen that pressurized fluid in the outlet port 30 of the valve 20 will pass through the valve member 66, via the passage 80, to the vehicle brake 76 to actuate the latter.

To actuate the vehicle brake 76, it is necessary only to shift the brake control valve 20 to its open position. This is done by manually advancing the plunger 50 axially into the bore 40 an amount sufficient to cause the springs 52 to act on the spring retainer 54 and urge the latter against the cup-like member 44 to shift it against the valve stem 42 to first block the opening 48 and then unseat the valve member 38 to permit fluid under pressure to flow around the valve 38 to the outlet port 30. The pressure at the outlet 30 causes the valve member 66 to shift to the right until its right end contacts the compression spring stop 78. When in this position, the valve member 66 blocks the bypass port 72 and is removed from the reduced bore end portion 64, thus placing the bore portion 64 in fluid communication with the radial openings 82 of the passage 80 through which fluid flows to actuate the brake 76.

The brake 76 may be subsequently deactivated by withdrawing the plunger 50 from the bore 40 an amount sufficient to permit the spring 40 to reseat the valve member 38 and stop fluid communication between the pump 12 and the outlet 30 and to permit the spring 46 to move the cup-like member 44 away from the stem 42 to unblock the passage 48 and place the outlet 30 in fluid communication with the return port 34 and hence the reservoir 16. The fluid pressure acting on the left end of the valve member 66 of the shuttle valve 60 then falls below the forces acting on the right end of the valve member 66 and the spring 68 acts to shift the valve member 66 to the left to place the reduced portion 70 into blocking engagement with the reduced end portion 64 of the bore 62. The valve member 66 is then once again in the closed position illustrated wherein the bypass port 72 is unblocked permitting the return of actuating fluid from the brake 74 directly to the sump 16 via the line 77 and the bypass line 37.

It is apparent that the only fluid which passes through the opening 48 is that which exists to the left of the valve member 66 when the valve member 38 closes. This small amount of fluid does not cause the unsatisfactory operation of the valve 20 which is attendant with the return of all of the actuating fluid from the brake passing through the opening 48 as is the case with the system illustrated in U.S. Pat. No. 3,317,252.

I claim:

1. In combination with a hydraulic brake control valve of the type including a valve bore having inlet, outlet and return ports respectively adapted for connection to a source of fluid pressure, a brake and a reservoir; and valve means selectively shiftably mounted in the bore for movement between a first position wherein fluid communication between the inlet and outlet ports is blocked and fluid communication between the outlet and return ports is established and a second position wherein the above conditions relative to the inlet, outlet and return ports are reversed; a shuttle valve comprising: a cylindrical valve bore including one section having a smaller diameter than an adjacent section; an inlet port opening into said one section and being connected to the outlet port of the brake control valve; outlet and return ports opening into said adjacent section and respectively being adapted for connection to a brake and a reservoir; said return port being located between the inlet and outlet ports; a valve member being slidably mounted in said bore and including a reduced-in-diameter end portion being exposed to fluid pressure at said inlet port and being dimensioned to snugly fit said one section of the bore; spring means biasing said valve member toward a first position, assumed when said brake control valve is in said first position; wherein said reduced-in-diameter end portion is located in said one section of the bore thus blocking the passage of fluid to and from the inlet port, the valve member at the same time being positioned to establish fluid communication between the outlet and return ports; said valve member being responsive to fluid pressure at said inlet port, when the brake control valve is in said second position, for shifting to a second position wherein said reduced-in-diameter end portion is withdrawn from said one section of the bore and fluid communication between said outlet and return ports is blocked; and fluid passage means located in said valve member so as to establish fluid communication between the inlet and outlet port only when the valve member is in said second position.

* * * * *